Patented Dec. 5, 1933

1,937,941

UNITED STATES PATENT OFFICE 1,937,941

PROCESS FOR REMOVING PHENOLS FROM LIQUORS CONTAINING SAME

Charles E. Braun, Burlington, Vt., assignor to The Barrett Company, New York, N. Y., a corporation of New Jersey No Drawing. Application January 25, 1930
Serial No. 423,559

13 Claims. (Cl. 260—154)

This invention relates to a process of extracting phenolic bodies from waste liquors, particularly from tar distillation plant liquors, weak ammonia liquors, and from plant effluents generally.

At one time the waste liquors of coke plants and coal tar distillation plants containing phenolic bodies were disposed of without any attempt to remove the phenolic bodies from the liquors. To effect more efficient operation and to lessen the public nuisance of phenol-containing wastes, it has been proposed to extract these phenols and to recover the same for subsequent sale. Among the methods employed may be mentioned extraction of the phenols by such solvents as benzol, a mixture of benzol and coal tar bases, or a light tar oil obtained by low temperature distillation of tar and from which the original phenols have been extracted. Either the weak ammonia liquors going to the ammonia still or the waste liquors flowing therefrom may be extracted to remove phenolic bodies. The former method has the advantages that volume of liquor requiring treatment is smaller, and that the liquor is free of dissolved lime. The presence of lime in the waste liquors may inhibit to some extent the removal of phenolic compounds therefrom.

One object of this invention is to extract phenolic bodies from liquors containing them and to thus prevent, economically and efficiently, phenols from entering drinking water sources and at the same time prevent economic waste by recovering the valuable phenols which cause pollution. A further object is to provide a process which will reduce the cost of operation by using as the extracting medium materials which do not require preliminary treatment.

As indicated above, it has been proposed in the past to extract phenols from weak ammonia liquors or from waste liquors containing the same by treatment of the liquors with various solvent oils. It has been considered that any such solvent oils used for this purpose must be originally free of phenol or in the case of coal tar oils, for example, be subjected to preliminary purification as by washing with caustic soda to remove the phenols therefrom, since it was thought that in order to secure a satisfactory extraction of tar acids from the waste liquors it was necessary that the extracting medium be originally free of tar acids (for example, see German Patent No. 436,522 and the article by R. M. Crawford on page 966 of Vol. 19, No. 9 of Industrial & Engineering Chemistry). I have discovered that contrary to these prior teachings, and apparently due to an enormously greater solubility of phenols in coal tar oils than in water, phenols may be efficiently and economically extracted from weak ammonia liquors and from waste liquors such as wash waters, by the use of unextracted coal tar oils containing their original content of tar acids. My results have demonstrated that contrary to previous expectations a coal-tar oil solvent containing originally a very much greater content of phenols than the liquor to be extracted will, upon contact with the liquor, absorb or remove all but a minor fraction of the phenol content of the liquor rather than, as has previously been expected, introduce phenols into the waste liquor. As illustrative of this point, I may note that in one experiment a waste wash water containing 9.2 grams of phenol per liter was treated with a coal tar oil containing 120 grams of phenol per liter in the ratio of one part of oil to four parts of water with the surprising result that the original liquor content of 9.2 grams of phenol per liter was reduced to 1.1 grams per liter, amounting to a phenol removal of 88%. It should be noted that the original concentration of phenol in the extracting coal tar oil was far greater than the concentration of phenol in the waste liquor after extraction.

It will be obvious that the above discoveries are of considerable commercial importance in that they obviate the necessity of subjecting coal tar oil solvents used for extracting phenols to an expensive preliminary purification with caustic soda. Furthermore, the heavy coal tar distillate containing phenolic bodies extracted from the weak ammonia liquors and waste liquors produced in accordance with my invention, finds a ready market as a creosote oil or may be treated by well known methods to recover the phenols therefrom.

This invention is particularly applicable to the treatment of effluents derived from tar distillation plants but is not limited thereto as it is also applicable to the treatment of weak ammonical liquors and other waste liquors containing an appreciable phenol content. Waste liquors of tar distillation plants, I have found by analysis, using the method of R. D. Williams, published in the "Journal of Industrial & Engineering Chemistry", Vol. 19, page 520, 1927, contain from about 4 to approximately 11 grams per liter of phenols and often contain in excess of 6 grams of phenol per liter of liquor. The phenol content of such waste liquors when treated in accordance with this invention is sufficiently reduced to permit the discharge of the extracted liquor into streams in many localities without substantial deleterious effects on the flora and fauna resulting from the phenolic bodies contained therein.

The coal tar solvent oils employed in accordance with my invention are preferably of a specific gravity substantially different from that of the waste liquors to be extracted, thereby lessening the tendency of the oil-water mixture to form emulsions and to fail to break or separate into distinct layers of water and oil, and preferably heavy coal tar oils having a specific gravity greater than that of the liquor are employed. I have found that oils of a specific gravity from approximately 1.04 to 1.13 at 138° C. may be used with very satisfactory results. As indicated above, the oils are used in the unextracted state, i.e., they may contain substantial amounts of phenol and will ordinarily be used in their original unextracted condition and without any preliminary purification with caustic. The coal tar oils may also contain their original content of pyridine bases, although if desired such pyridine bases may be removed as by subjecting the oil to a preliminary washing with mineral acid.

If desired, neutral or extracted light or heavy oils may be added to the unextracted heavy oil and the resultant mixture used as the extracting medium. The addition of neutral or extracted oils will, of course, increase the cost of operation and, accordingly, the use of an extracting medium containing only unextracted oil, is considered preferable. It will be understood, however, that my invention includes unextracted heavy oils to which some neutral and/or extracted oils have been added.

In one embodiment of this invention a measured volume of coal tar distillate containing its original tar acids and tar bases is pumped into a tank. Preferably a cylindrical iron tank, mounted in a horizontal position, provided with steam coils for heating the contents of the tank, a perforated pipe for blowing air into the tank and thus agitating and mixing the oil and liquor therein so that intimate contact of the two is assured, is used. It will be understood that any suitable apparatus in which oil and liquor may be mixed and agitated may be used and as the apparatus forms no part of this invention, further description thereof is considered unnecessary. The heavy coal tar oils particularly contemplated for use in this invention, are oils produced from coal distillation gases or by distilling tar, the desired fractional distillate being used without further treatment. A volume of weak ammonia liquor or plant effluents containing phenolic substances and equal to about one to three times the volume of oil may next be pumped into the tank in such a manner that the effluent is forced to pass through the oil which is already in the tank. The proportions of effluent and oil may vary, depending upon the oil used. Heat is applied to the charge in the tank and its temperature is raised to 60-80° C. When at this temperature, the charge is thoroughly agitated, preferably by blowing air therethrough preferably for about three hours. During the agitation, the temperature is held substantially constant at from 60-80° C. After three hours the agitation is stopped and the charge allowed to settle with the temperature still held at 60-80° C. Test samples are taken from time to time to ascertain the quality of the separation of the charge into an upper water layer and a lower oil layer. The separation of the charge into oil and water layers after agitation may be determined by putting a long glass tube into the tank, closing off the top and after withdrawal noting the condition at the interface between the oil and the water. After a good separation has been obtained, which usually takes about three to six hours when a clean oil has been used, the tank is emptied. The oil layer, which contains the phenolic bodies, is pumped to a storage tank and the water layer is pumped into a sewer and discharged.

As one example of the practice of my invention, a charge of 6000 gallons of wash liquor having an original phenol content of 9.78 grams of phenol per liter was agitated with an unextracted heavy oil of a specific gravity of 1.124 at 38° C. and having an original phenol content of about 25 grams of phenol per liter, the ratio of oil to water being about 1 to 2. The mixture was agitated for three hours at a temperature of approximately 80° C. A 70.8% phenol removal resulted, the extracted liquor having a phenol content of only 2.86 grams of phenol per liter.

As another example, using a ratio of one part oil to one part liquor and an unextracted heavy oil of a specific gravity of 1.131 at 38° C. having a tar acid content of 22 grams per liter and agitating the oil and liquor totalling 8000 gallons at a temperature of approximately 80° C. for three hours, I obtained a 77.7% phenol removal. The original phenol content of the waste liquor was 9.82 grams per liter and the extracted liquor had a phenol content of 2.19 grams per liter.

As a further example, using a ratio of one part oil to one part liquor, about 4000 gallons of liquor containing originally 6.28 grams of phenol per liter were agitated with an unextracted oil having a specific gravity of 1.124 at 38° C. for about three hours and a 75.3% phenol removal accomplished. The original phenol content of the oil was about 27 grams of phenol per liter and the extracted liquor had a phenol content of only 1.55 grams of phenol per liter.

It is to be understood that my invention is not limited to any particular method of carrying out the extraction. For example, instead of using a batch process as above described, I may carry out the extraction continuously. One method of doing this is to introduce the liquor containing the phenolic bodies and oil separately at top and bottom of an extraction tower provided with packing or baffle plates in such a way as to cause countercurrent flow of the liquor and oil in more or less dispersed form. If the oil is specifically heavier than the liquor, it is introduced at the top and the liquor at the bottom; if the oil is lighter, the reverse arrangement is used. Oil and liquor are continuously introduced, mingle after being more or less broken up into fine streams or droplets, and are continuously and separately withdrawn, any well known means being used to permit substantially complete separation of the liquor and oil.

As previously mentioned, in order to secure a good separation of the oil and water layers after agitation, the oil used should preferably have a specific gravity sufficiently different from that of the liquor to permit ready breaking. Also, it has been found that approximately one part of oil to four parts of liquor is ordinarily the least amount of oil which in commercial operation will satisfactorily extract the liquor. Good results have been obtained with one part of oil to three parts of liquor and plant operation indicates that the best extraction occurs when one part of oil is used with one part of liquor.

The particular ratio of oil to liquor, however, will depend on their respective phenol contents, the final permissible phenol concentration in the waste liquor, the temperature at which the extraction takes place, the intimacy of mixing, the alkalinity of the liquor, etc. Owing to differences in the properties and phenolic contents of the tars distilled, the distillate oils produced may vary in phenolic contents within wide limits. A lower oil to liquor ratio may be used or a higher degree of phenol removal obtained by the use of unextracted oils of low original phenol content.

As above indicated, my invention is particularly applicable to the treatment of liquors containing in the neighborhood of at least 4 grams of phenol per liter to accomplish a substantial removal of phenols therefrom and where a complete removal of phenol is not essential. If it is desired that the phenol content of the waste liquor amount to less than the 1 to 2 grams of phenol per liter ordinarily remaining therein after extraction in accordance with my invention, such liquor may, if desired, be subjected to a further extraction with solvent oils or other means of dephenolization. In such circumstances my invention will prove of value in reducing operating costs in that the original phenol content of the liquor may be greatly reduced by use of my process preliminary to the further treatment of the liquors and thus proportionately reduce the quantity of phenol-free solvent oil or caustic alkali required in the second extraction.

I claim:

1. The method of removing phenolic bodies from liquors containing the same, which comprises bringing the liquors into intimate contact with an extracting medium comprising coal tar oil of a specific gravity different from that of the liquor and containing its original content of tar acids.

2. The method of removing phenolic bodies from liquors containing in excess of 4 grams per liter of said bodies, which comprises bringing the liquors into intimate contact with unextracted coal-tar oil containing its original content of tar acids.

3. In a method of removing phenolic bodies from liquors containing in excess of 4 grams per liter of said bodies, the step which comprises bringing the liquors into intimate contact with the unextracted coal-tar oil containing a substantial quantity of tar acids and having a specific gravity sufficiently different from that of the liquor to permit gravity separation.

4. The method of removing phenolic bodies from liquors containing the same, which comprises bringing the liquors into intimate contact with a heavy coal-tar oil from which the normally occurring tar acids have not been extracted and of a specific gravity of not less than approximately 1.04 at 38° C.

5. The method of removing phenolic bodies from liquors containing the same, which comprises bringing the liquors into intimate contact with a coal-tar oil of specific gravity from 1.04 to 1.131 at 38° C. and which contains its original tar acids.

6. The method of removing phenolic bodies from liquors containing said bodies, which comprises bringing the liquors in contact with a heavy coal-tar oil of specific gravity from 1.04 to 1.131 at 38° C. which contains its original tar acids and tar bases and agitating the resultant mixture.

7. In a method of removing phenolic bodies from liquors containing in excess of 4 grams per liter thereof, the steps which comprise bringing the liquors in contact with a heavy coal-tar oil from which the original tar acids and tar bases have not been extracted and which has a greater specific gravity than the liquor and agitating the resultant mixture until at least 70 per cent of the phenols have been removed from the liquors by the heavy coal-tar oil.

8. The method of removing phenolic bodies from liquors containing the same, which comprises bringing the liquors into intimate contact with an unextracted heavy coal-tar oil containing a substantial quantity of tar acids in a ratio of not more than four parts of liquor to one part of oil.

9. The steps in a method of removing phenolic bodies from liquors containing in excess of 4 grams per liter thereof, which comprise bringing the liquors in contact with a heavy unextracted coal-tar oil containing tar acids in excess of about 22 grams per liter in the ratio of one part of liquor to one part of oil and agitating the resultant mixture.

10. The method of removing phenolic bodies from liquors containing in excess of 4 grams per liter thereof, which comprises bringing the liquors into intimate contact with a heavy coal-tar oil containing its original tar acids, and having a specific gravity of from 1.04 to 1.131 at 38° C. in the ratio of one part of liquor to one part of oil.

11. The method of treating liquors containing in excess of 4 grams per liter of phenolic bodies, which comprises agitating the liquors with an unextracted heavy coal-tar oil containing substantial quantities of tar acids while heating to remove at least 70 per cent of the phenolic bodies from the liquors.

12. The method of treating liquors containing in excess of 6 grams per liter of phenolic bodies, which comprises bringing the liquors in contact with a heavy coal-tar oil containing its original tar acids and tar bases and having a specific gravity of from 1.04 to 1.131 at 38° C., and agitating the resultant mixture while maintaining the temperature at 60 to 80° C. during the treatment.

13. The process of extracting phenolic bodies from liquors containing the same, which comprises intimately contacting the liquors throughout the extraction process with an extracting medium comprising coal tar oil containing its original content of tar acids.

CHARLES E. BRAUN.